United States Patent
Davies-Smith et al.

(10) Patent No.: US 10,806,244 B2
(45) Date of Patent: Oct. 20, 2020

(54) PERSONAL CARE IMPLEMENT WITH FLUID DELIVERY SYSTEM

(71) Applicant: Colgate-Palmolive Company, New York, NY (US)

(72) Inventors: Leighton Davies-Smith, Lebanon, NJ (US); Al Aquanza Sprosta, Maplewood, NJ (US); Shyamala Pillai, Hillsborough, NJ (US)

(73) Assignee: Colgate-Palmolive Company, New York, NY (US)

( * ) Notice: Subject to any disclaimer, the term of this patent is extended or adjusted under 35 U.S.C. 154(b) by 509 days.

(21) Appl. No.: 15/840,656

(22) Filed: Dec. 13, 2017

(65) Prior Publication Data
US 2018/0168326 A1    Jun. 21, 2018

Related U.S. Application Data

(60) Provisional application No. 62/436,773, filed on Dec. 20, 2016.

(51) Int. Cl.
*B43K 8/06*    (2006.01)
*A46B 11/00*    (2006.01)
(Continued)

(52) U.S. Cl.
CPC .............. *A46B 11/001* (2013.01); *A46B 9/04* (2013.01); *A46B 11/002* (2013.01);
(Continued)

(58) Field of Classification Search
CPC ............ A46B 11/0082; A46B 11/0079; A46B 11/001; A46B 11/002; A46B 9/04; A46B 13/023; A46B 15/0051; A61C 17/227
(Continued)

(56) References Cited

U.S. PATENT DOCUMENTS

| 3,873,218 A | 3/1975 | Yoshida |
| 5,102,251 A | 4/1992 | Kaufmann |

(Continued)

FOREIGN PATENT DOCUMENTS

| CN | 1271256 | 10/2000 |
| CN | 201798216 | 4/2011 |

(Continued)

OTHER PUBLICATIONS

International Search Report and Written Opinion of the International Searching Authority in International Application No. PCT/US2017/066106, dated Mar. 26, 2018.

*Primary Examiner* — Jennifer C Chiang

(57) ABSTRACT

A personal care implement with a fluid dispensing system includes a fluid applicator, a fluid dispensing assembly including main and overflow reservoirs, and a capillary member in fluid communication with the reservoirs and the applicator for dispensing personal care fluid stored in the reservoirs via capillary action. An air venting system in one arrangement allows ambient air to be drawn into the main reservoir through the overflow reservoir for alleviating vacuum formed in the main reservoir by the capillary action fluid dispensing process. The venting system may include an external vent to atmosphere from the overflow reservoir and an internal vent between the reservoirs. In the event air trapped within the main reservoir expands due to changes in altitude or temperature, fluid in the main reservoir is expelled into the overflow reservoir via the internal vent. In one implementation, the personal care implement may be an oral care implement.

20 Claims, 10 Drawing Sheets

(51) Int. Cl.
- *A46B 13/02* (2006.01)
- *A61C 17/22* (2006.01)
- *A46B 9/04* (2006.01)
- *A46B 15/00* (2006.01)

(52) U.S. Cl.
CPC ........ *A46B 11/0079* (2013.01); *A46B 13/023* (2013.01); *A46B 15/0051* (2013.01); *A61C 17/227* (2013.01); *A46B 11/0082* (2013.01); *A46B 15/0032* (2013.01); *A46B 15/0081* (2013.01); *A46B 2200/1066* (2013.01)

(58) Field of Classification Search
USPC .......................................................... 401/198
See application file for complete search history.

(56) References Cited

U.S. PATENT DOCUMENTS

| | | | |
|---|---|---|---|
| 6,089,776 A | 7/2000 | Kaufmann | |
| 6,095,707 A | 8/2000 | Kaufmann | |
| 6,164,858 A | 12/2000 | Kaufmann | |
| 6,497,527 B2 | 12/2002 | Kautfmann | |
| 6,659,671 B1 | 12/2003 | Fukami et al. | |
| 8,398,326 B2 * | 3/2013 | Jimenez | A46B 11/0082 401/282 |
| 8,517,728 B2 | 8/2013 | Gatzemeyer et al. | |
| 9,033,602 B2 | 5/2015 | Boyd | |
| 9,237,798 B2 | 1/2016 | Jimenez et al. | |
| 9,332,829 B2 | 5/2016 | Wu | |
| 9,603,444 B2 | 3/2017 | Boyd | |
| 9,648,943 B2 | 5/2017 | Jimenez et al. | |
| 2017/0215574 A1 | 8/2017 | Jimenez et al. | |

FOREIGN PATENT DOCUMENTS

| | | |
|---|---|---|
| CN | 103429115 | 12/2013 |
| CN | 103989310 | 8/2014 |
| DE | 2754338 A1 | 6/1979 |
| EP | 0624483 | 11/1994 |
| EP | 1281539 | 2/2003 |
| RU | 2536199 | 12/2014 |
| WO | 2002/076763 | 10/2002 |
| WO | 2003/101760 | 12/2003 |
| WO | 2011/109626 | 9/2011 |

* cited by examiner

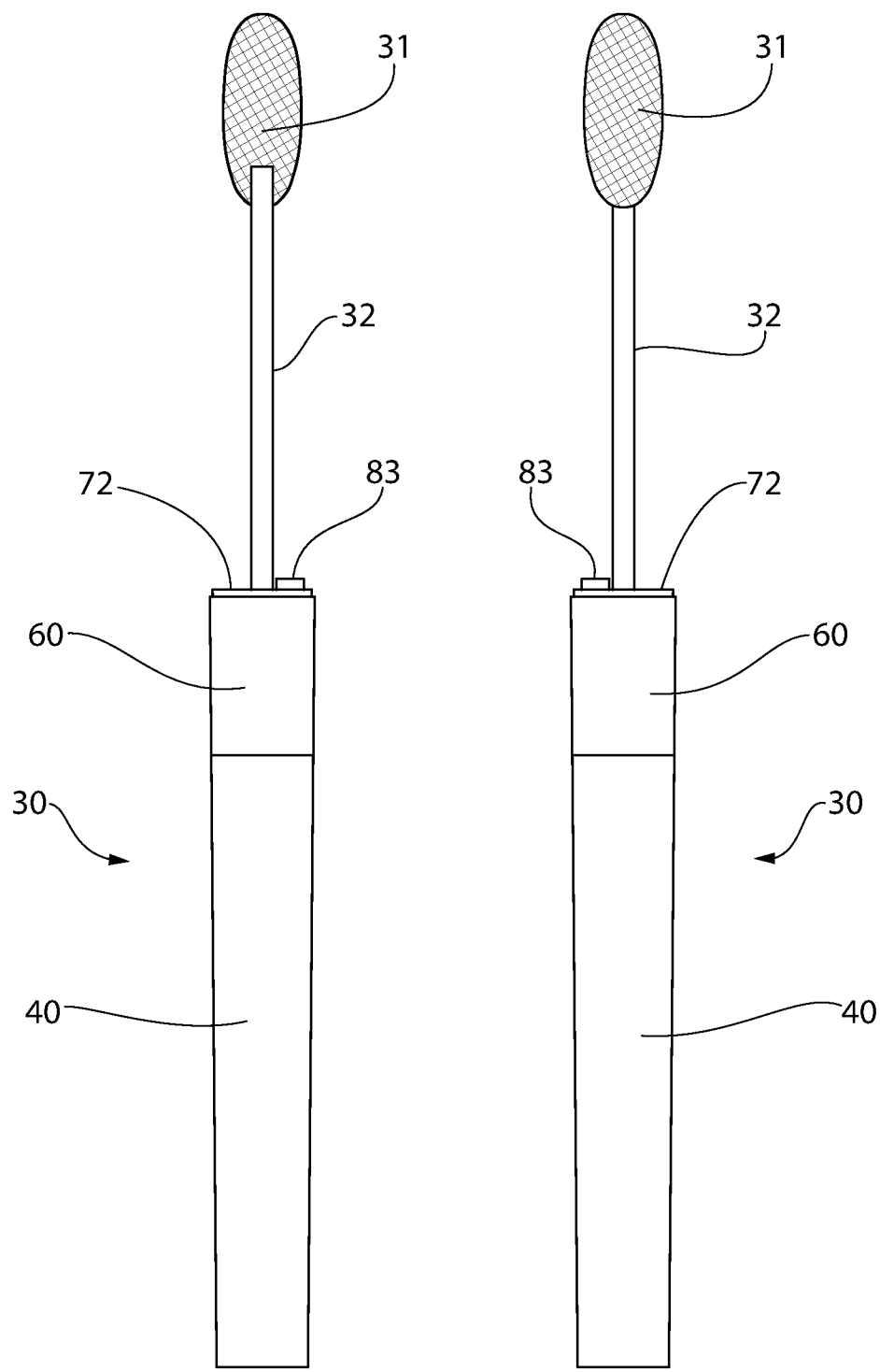

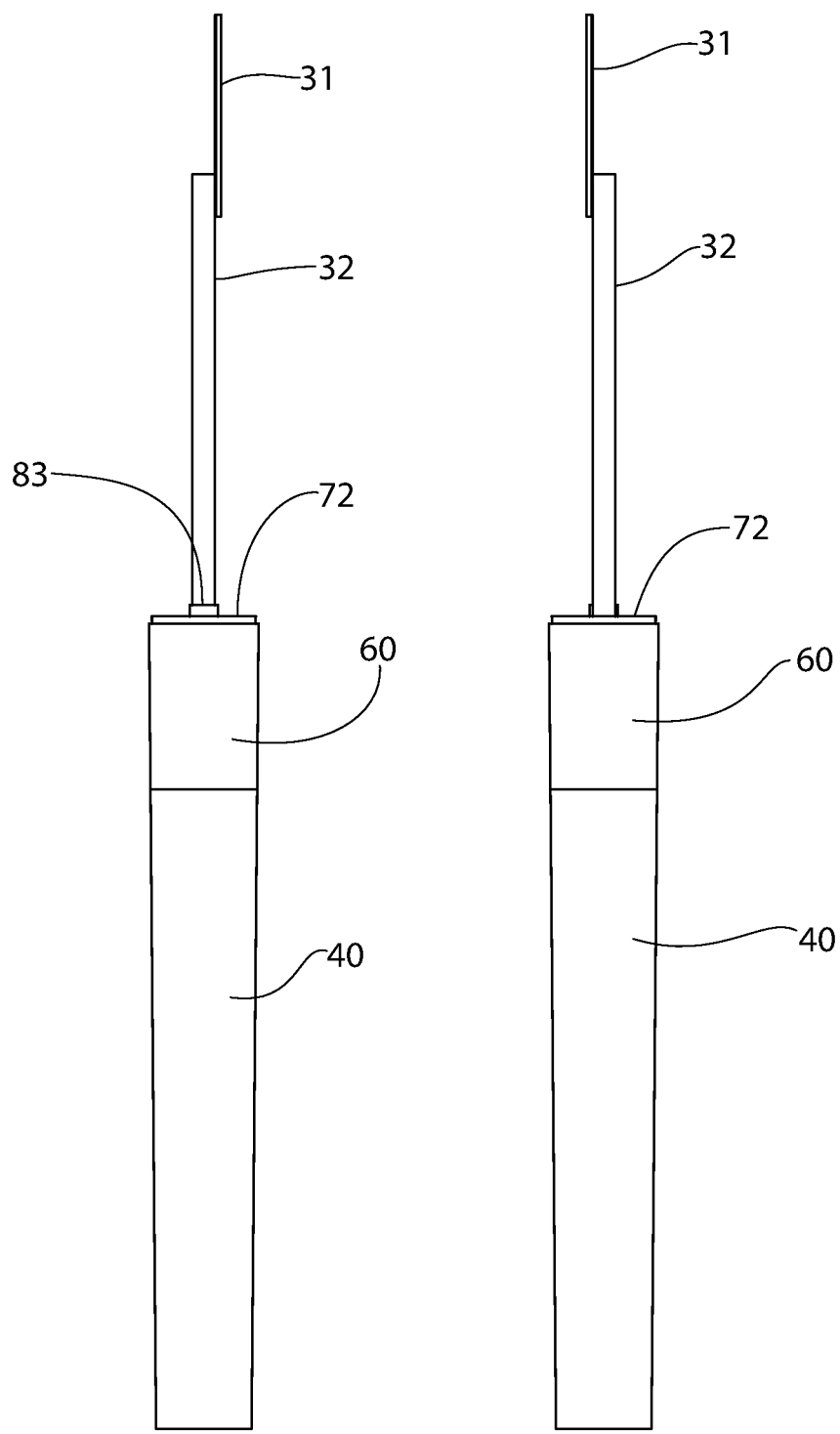

PERSONAL CARE IMPLEMENT WITH FLUID DELIVERY SYSTEM

CROSS-REFERENCE TO RELATED APPLICATIONS

The present application claims the benefit of U.S. Provisional Application Ser. No. 62/436,773, filed Dec. 20, 2016, the entirety of which is incorporated herein by reference.

BACKGROUND

Personal care implements, including oral care implements such as toothbrushes in one example, are typically used by applying dentifrice or toothpaste to tooth cleaning elements such as bristles followed by brushing regions of the oral cavity, e.g., the teeth, tongue, and/or gums. Some toothbrushes have been equipped with fluid reservoirs and systems for dispensing auxiliary personal care fluids such as oral care fluids containing active agents, such as without limitation whitening agents, breath-freshening agents, antibacterial agents, and others during the tooth brushing regimen. Such systems may have a capillary component or wick which delivers the oral care fluid to the user via capillary action.

Under one scenario when fluid is dispensed from the reservoir, a negative pressure or vacuum develops within the reservoir caused by the outflow of fluid dispensed to user. This adversely decreases the flow rate of the oral care fluid to the user even though the reserve of fluid has not been fully depleted. The system become vacuum bound which is exacerbated by further attempts at fluid dispensing. Although the capillary wick can theoretically act as an indirect flow path to provide a limited amount of ambient air to replace the dispensed fluid from the reservoir, this is typically insufficient under a variety of conditions to effectively alleviate the vacuum.

Under another scenario, air trapped in the reservoir expands when an increase in altitude occurs such as during an airplane flight and/or the temperature increases. Unlike air, the oral care fluid in the reservoir is generally incompressible. Without the ability to compensate for this expansion in the reservoir, pressure applied to the fluid by the expanding trapped air pocket causes unwanted outflow fluid leaks to occur from the toothbrush.

An improved oral care implement and associate fluid dispensing system is desired for delivering auxiliary active agents to the user's oral cavity.

BRIEF SUMMARY

The present invention provides a personal care implement having a capillary action personal care fluid delivery or dispensing system which addresses the shortcomings of the prior systems. The system includes a wicking or capillary member for fluid transfer which may be constructed of various configurations and materials. The capillary member dispenses the fluid from reservoirs in a fluid dispensing assembly via capillary action and defines a primary fluid flow path to an applicator on the personal care implement. In one embodiment, the personal care implement may be an oral care implement such as a toothbrush or another type implement which houses the dispensing system.

In one non-limiting aspect, the fluid dispensing system includes provisions for allowing the ingress or infiltration of ambient air into the main fluid reservoir to replace the volume of personal care fluid dispensed, thereby avoiding vacuum or negative pressure buildup in the reservoir which impedes fluid delivery. In another non-limiting aspect, the fluid dispensing system includes provisions to compensate for expansion of air trapped in the fluid reservoir by providing a second non-capillary direct fluid flow path between a main reservoir and an overflow reservoir which prevents or minimizes outward leakage of the fluid from the applicator of the oral care implement.

In one embodiment, a personal care implement includes: a fluid applicator; a fluid dispensing assembly comprising a main reservoir storing an oral care fluid and an overflow reservoir fluidly coupled thereto; and a capillary member extending through and in fluid communication with the main and overflow reservoirs, the capillary member fluidly coupled to the applicator wherein the fluid flows via capillary action from the fluid dispensing assembly to the applicator; the overflow reservoir in fluid communication with external ambient atmosphere via an external vent; and the overflow reservoir in fluid communication with the main reservoir via an internal vent formed between the overflow and main reservoirs; wherein a non-capillary air flow pathway is formed through the overflow reservoir between atmosphere and the main reservoir via the internal and external vents.

In another embodiment, a personal care implement includes: a fluid applicator; a main reservoir containing a personal care fluid; an overflow reservoir fluidly coupled to the main reservoir; a capillary fluid flow path comprising an elongated capillary member that extends through the main and overflow reservoirs; and a non-capillary fluid flow path extending between the main and overflow reservoir and configured such that the personal care fluid can flow through the non-capillary flow path from the main reservoir to the overflow reservoir.

In yet another embodiment, an oral care implement includes: a longitudinal axis; a handle; a head coupled to the handle, the head having a front surface including tooth cleaning elements and an opposing rear surface; a fluid applicator positioned on the head; a fluid dispensing cartridge assembly disposed in the handle, the cartridge assembly comprising a main reservoir storing an personal care fluid and an overflow reservoir coupled thereto; an elongated fluid transfer member comprising a capillary material extending through and in fluid communication with the main and overflow reservoirs, the fluid transfer member fluidly coupled to the applicator wherein the fluid flows via capillary action from the fluid dispensing cartridge to the applicator; the overflow reservoir in fluid communication with external ambient atmosphere via an external vent; and the overflow reservoir in fluid communication with the main reservoir via an internal vent formed between the overflow and main reservoirs; wherein a non-capillary air flow pathway is formed through the overflow reservoir between atmosphere and the main reservoir via the internal and external vents to allow ingress of ambient air into the main reservoir.

In yet another embodiment, a toothbrush with fluid dispensing system includes: a longitudinal axis; a handle; a head coupled to the handle, the head having a front surface containing tooth cleaning elements and an opposing rear surface; a fluid applicator disposed on the rear surface of the head; a tubular main reservoir disposed in the handle and containing an personal care fluid; a tubular overflow reservoir coaxially aligned with and coupled to the main reservoir in end-to-end relationship; a capillary fluid flow path comprising an elongated capillary member that extends through the main and overflow reservoirs, the capillary member formed of a capillary material and having a proximal end portion disposed in the main reservoir, a distal end portion in abutting contact with the applicator, and an intermediate portion disposed in the overflow reservoir, the personal care fluid flowing via capillary action from the main and overflow reservoirs to the applicator for dispensing the personal care fluid from the toothbrush head; and a non-capillary fluid flow path comprising an internal vent disposed in a partition wall separating the main and overflow reservoirs; wherein expansion of air in the main reservoir forcibly causes the personal care fluid to bypass the capillary action personal care fluid flow path and flow directly from the main reservoir into the overflow reservoir through the internal vent. In one embodiment, the toothbrush further includes an external vent disposed in the overflow reservoir in fluid communication with external ambient atmosphere, wherein the internal and external vents collectively form an air flow path separate from the capillary fluid flow path between atmosphere and the main reservoir to draw ambient air into the main reservoir through the overflow reservoir.

A method for breaking a vacuum in a fluid dispensing system of an oral care implement is provided. The method includes: providing an oral care implement including a head having a fluid applicator, a fluid dispensing cartridge comprising main and overflow reservoirs, and a capillary member in fluid communication with the applicator and the main and overflow reservoirs; storing an personal care fluid in a main reservoir; dispensing a portion of the fluid via capillary action from the main reservoir to the applicator via the capillary member; forming a vacuum in the main reservoir; drawing ambient air into the overflow reservoir via an external vent; drawing the ambient air in the overflow reservoir into the main reservoir through an internal vent fluidly coupling the main reservoir to the overflow vent; and relieving the vacuum. In one embodiment, the method further includes steps of: expanding an air pocket present within the main reservoir; and forcibly expelling a portion of the personal care fluid in the main reservoir into the overflow reservoir through the internal vent.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The features, and advantages of the invention will be apparent from the following more detailed description of certain embodiments of the invention and as illustrated in the accompanying drawings in which:

FIG. 7 is a front elevation view of the toothbrush of FIG. 1;

FIG. 8 is a rear elevation view of the toothbrush of FIG. 1;

FIG. 9 is right side elevation view of the toothbrush of FIG. 1;

FIG. 10 is a left side elevation view of the toothbrush of FIG. 1;

DETAILED DESCRIPTION

Figure 1:
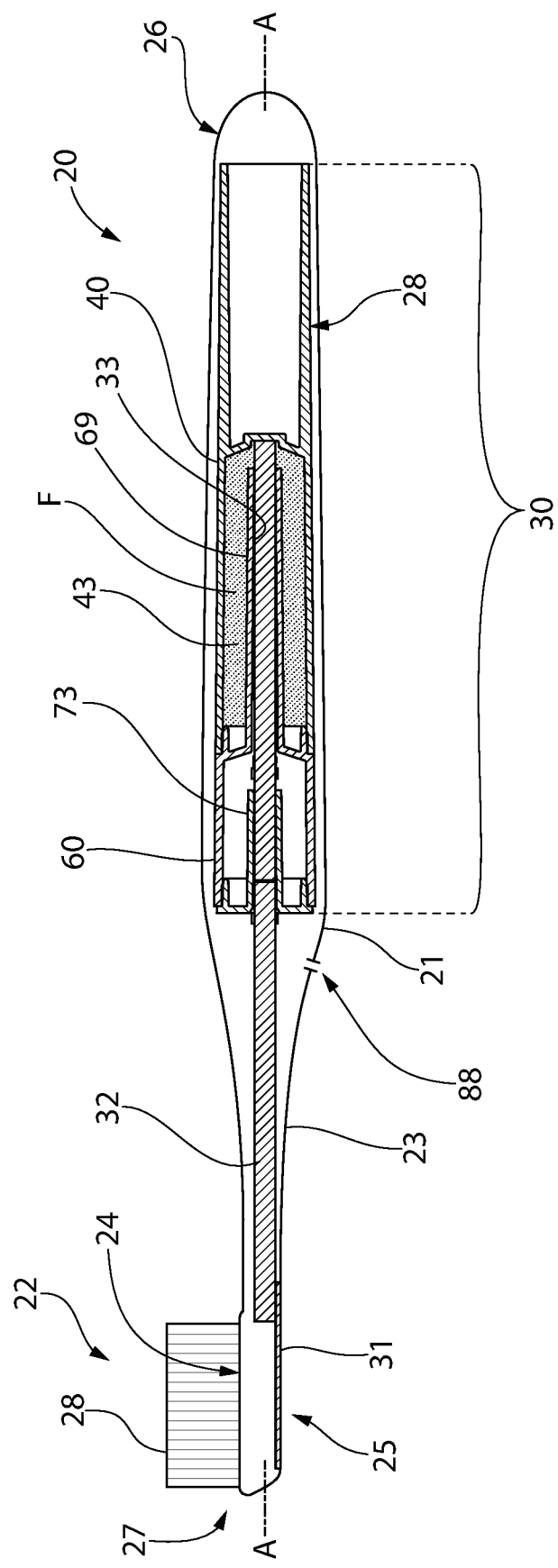
FIG. 1 is a schematic side view of a toothbrush having a fluid dispensing system according to one embodiment of the invention.
Figure 2:
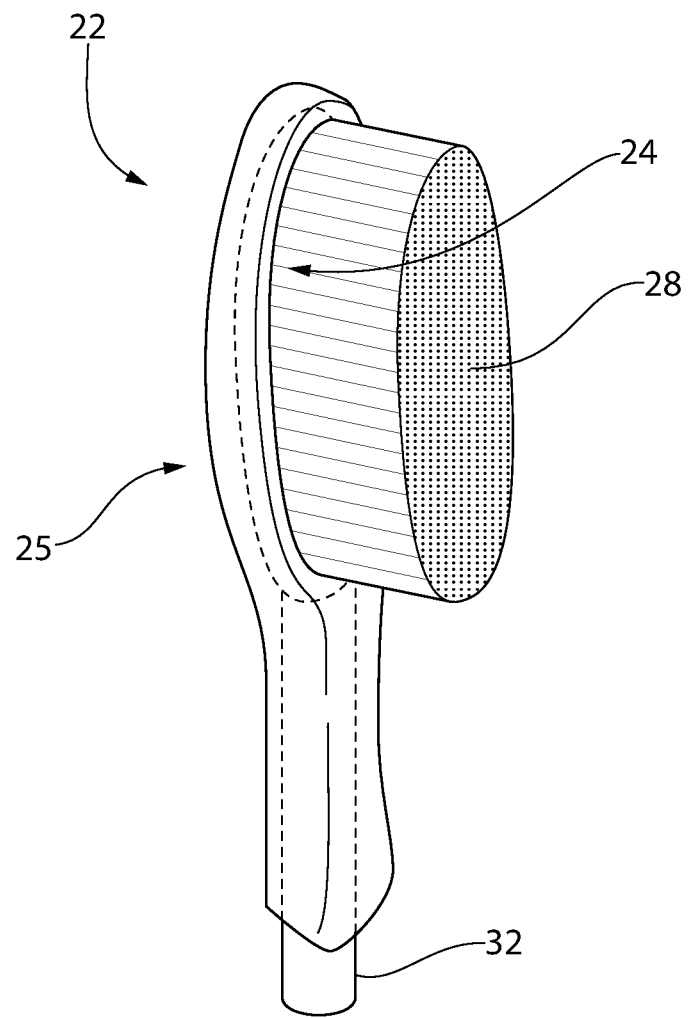
FIG. 2 is a front perspective view of the head of the toothbrush shown in FIG. 1.
Figure 3:
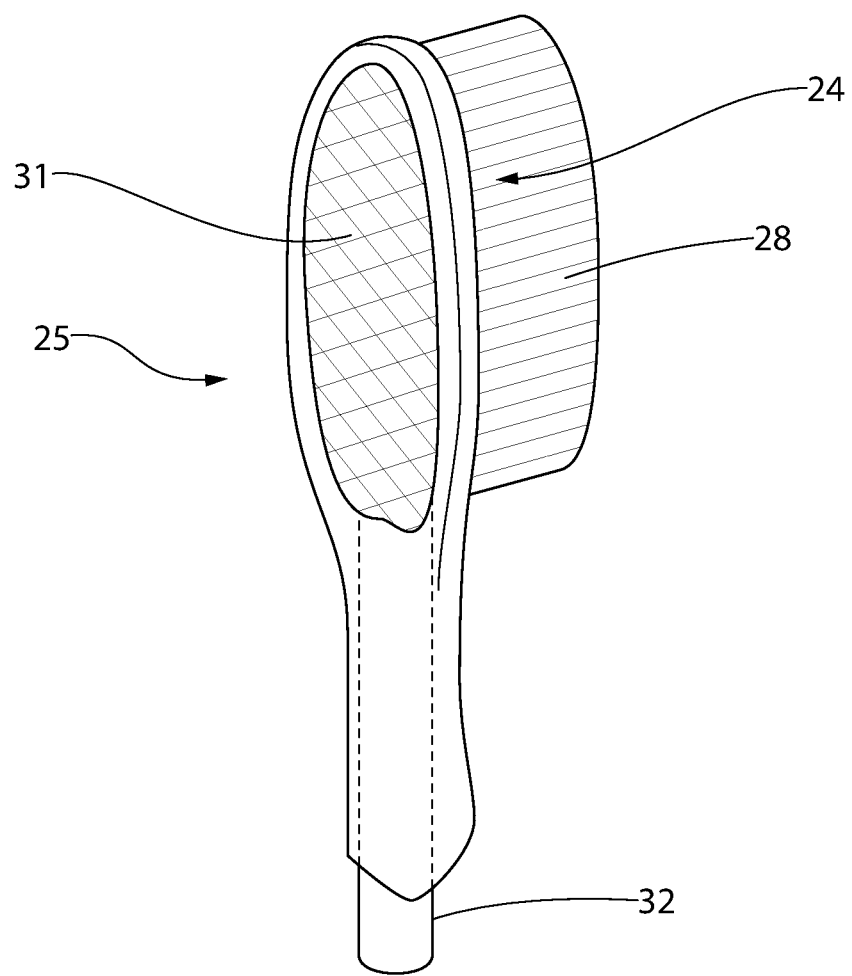
FIG. 3 is a rear perspective view of the head of the toothbrush shown in FIG. 1.
Figures 4, 5:
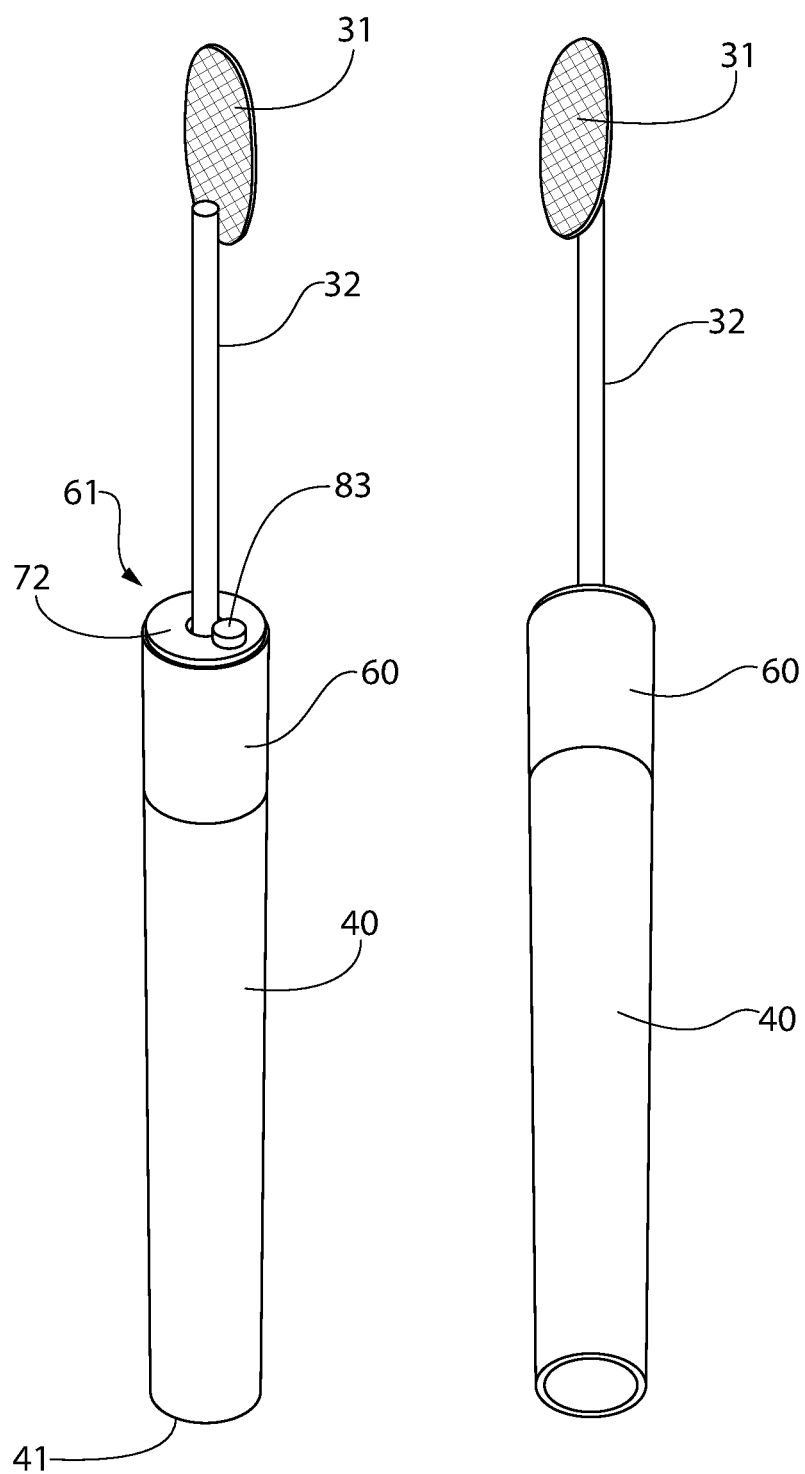
FIG. 4 is a front perspective view of the toothbrush of FIG. 1.
FIG. 5 is a rear perspective view of the toothbrush of FIG. 1.
Figure 6:
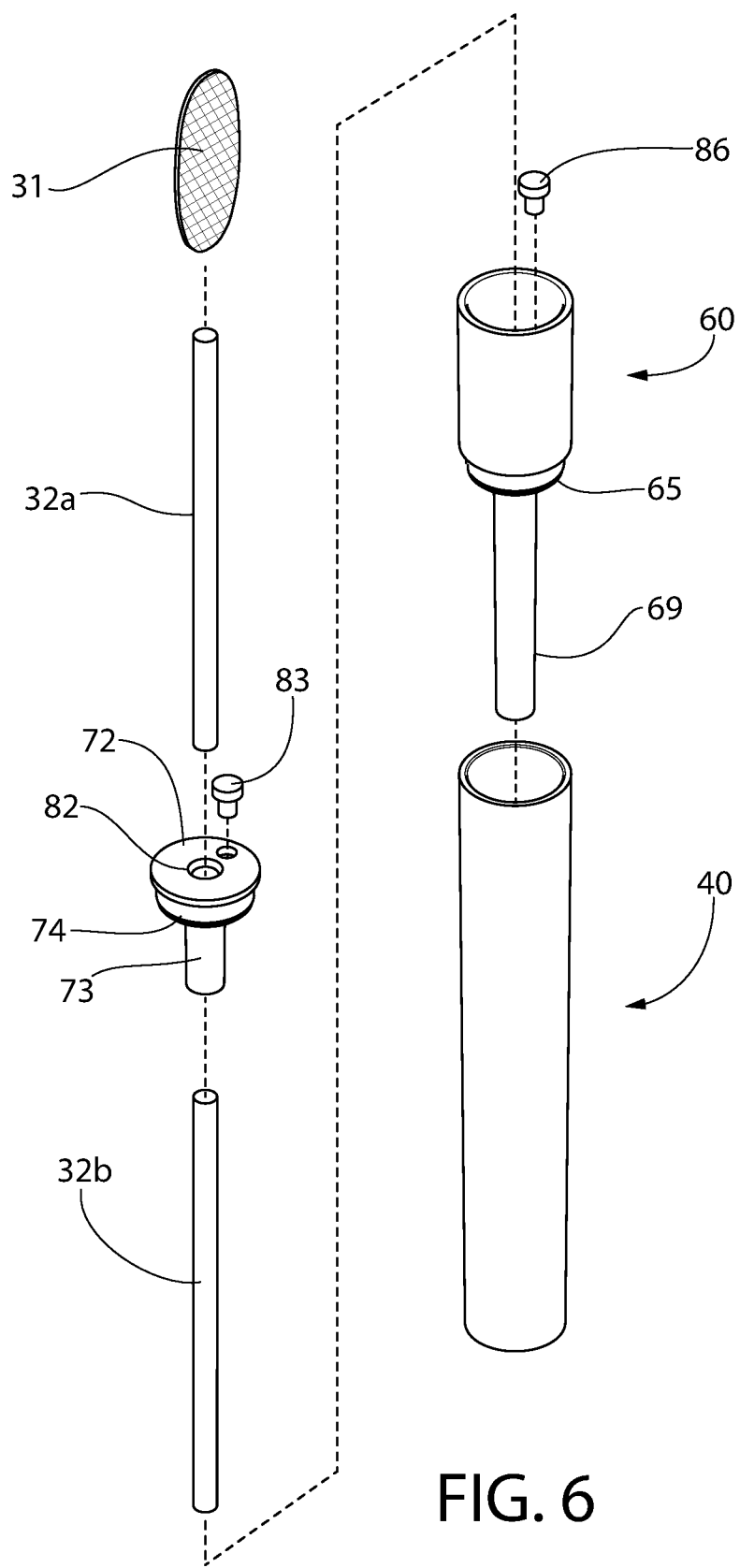
FIG. 6 is an exploded perspective view of the toothbrush of FIG. 1.
Figure 11:
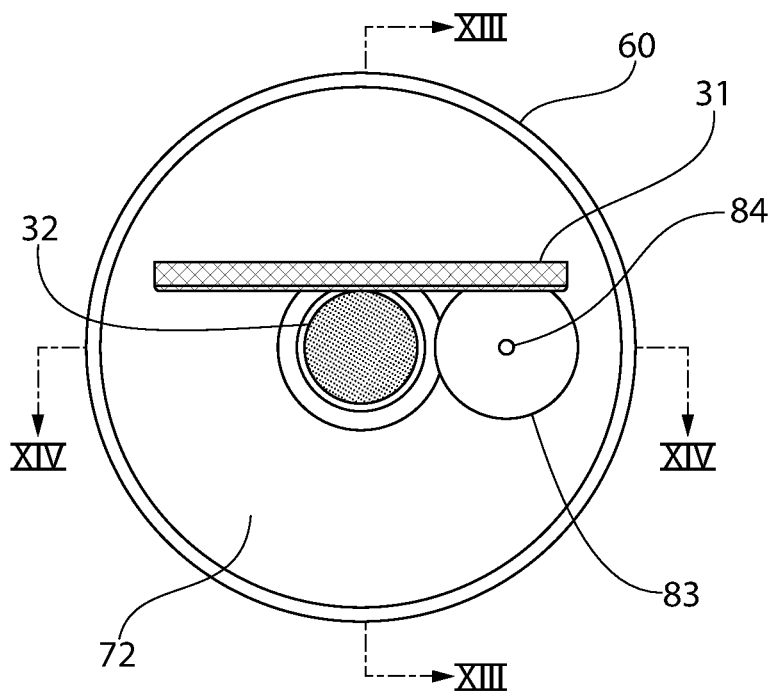
FIG. 11 is a top plan view of the toothbrush of FIG. 1.
Figure 12:
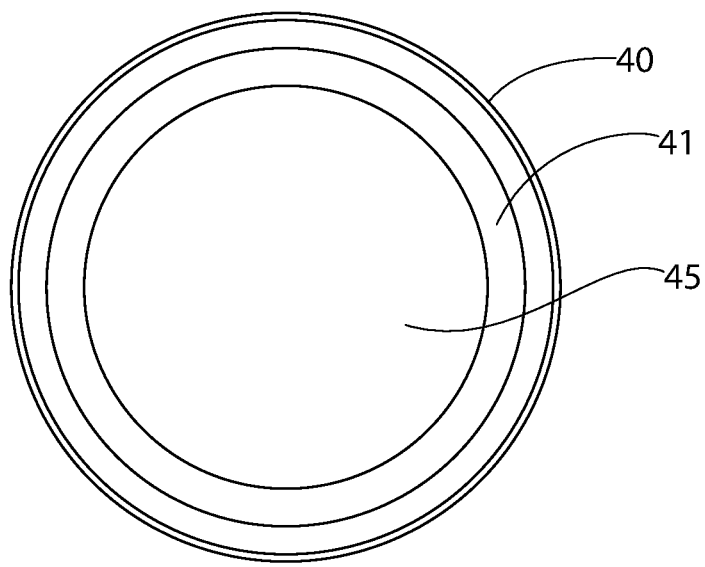
FIG. 12 is a bottom plan view of the toothbrush of FIG. 1.
Figure 13:
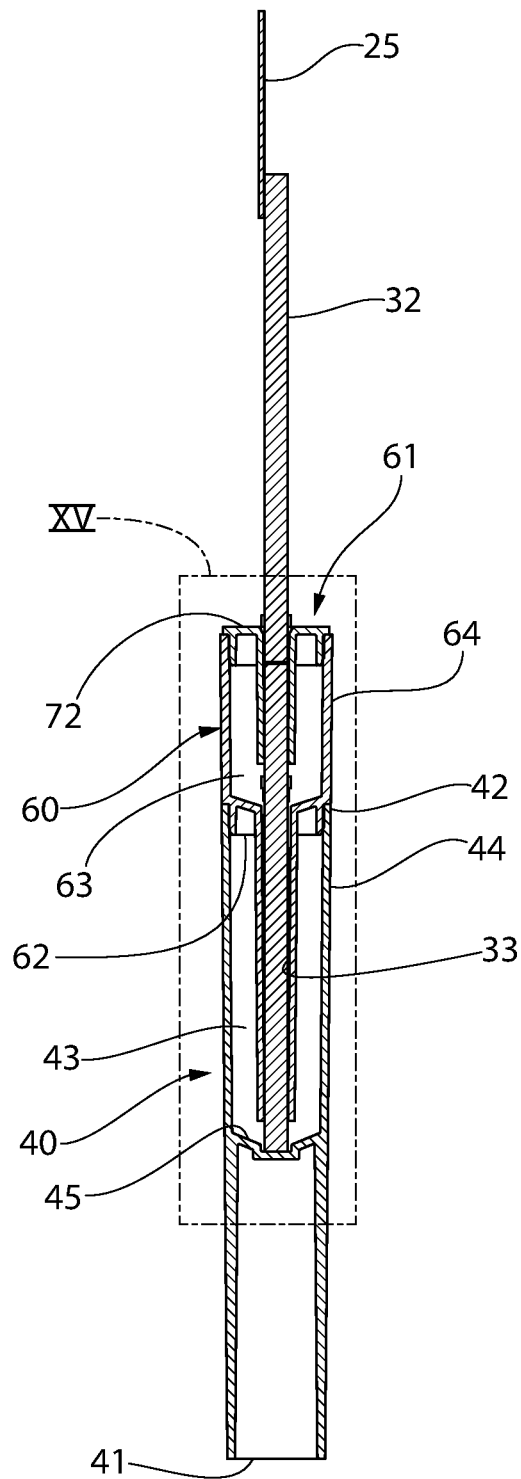
FIG. 13 is left side cross sectional view of the toothbrush of FIG. 1.
Figure 14:
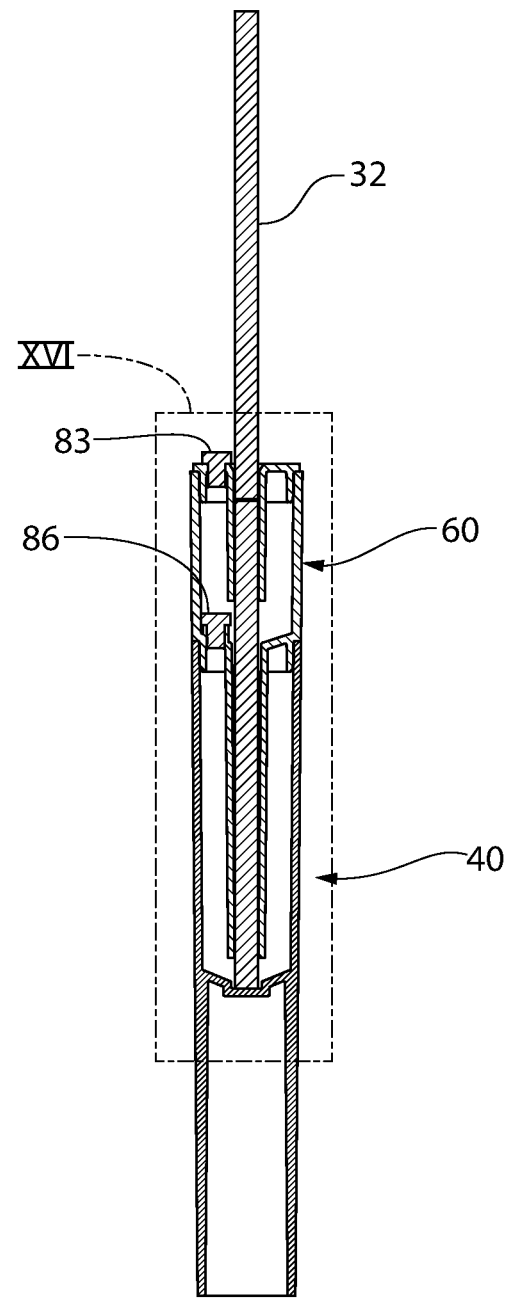
FIG. 14 is a rear elevation cross sectional view of the toothbrush of FIG. 1.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

FIG. 1 shows one non-limiting embodiment of a personal care implement containing a personal care fluid stored in a fluid dispensing assembly. The personal care implement may be in the form of an oral care implement such as a toothbrush and the personal care fluid may be an oral care fluid. Toothbrush 20 has an axially elongated body defining a longitudinal axis A-A. The toothbrush includes a handle 21 defining a proximal end 26 of the toothbrush and a head 22 defining an opposite distal end 27 of the toothbrush. The head 22 is supported by the handle, such as via a narrowed intermediate neck portion 23 in one configuration. Head 22 includes a front side 24 having a plurality of tooth cleaning elements 28 such as bristles and/or elastomeric elements and an opposing rear side 25. The body of the toothbrush 20 may having any suitable configuration including straight sections and/or curved sections with varying diameters or width and is expressly not limited to the simple example illustrated in FIG. 1 for convenience. Toothbrush 20 may be made of any orally hygienic suitable material such as polymer (e.g. polyethylene, etc.) formed by injection molding and/or other processes.

The fluid dispensing system according to the present disclosure generally includes a fluid dispensing assembly which in some non-limiting embodiments may be a fluid dispensing cartridge 30 disposed in the handle 21 of the toothbrush and comprising a main reservoir 40 and an overflow reservoir 60, a fluid applicator 31 disposed in the head 22 of the toothbrush, and an axially extending capillary channel 33 extending axially through the main and overflow reservoirs. The capillary channel 33 comprises wicking-type fluid transfer capillary member 32 which fluidly couples the reservoirs 40, 60 to the applicator 31 via capillary action. The applicator 31 may be disposed on the rear side 25 of the toothbrush head 22; however, other locations including the front side 24 or combination front/rear sides may be used. Applicator 31 may be configured to form one or multiple fluid outlets on the head 22 of the toothbrush 20. In one embodiment, the fluid dispensing cartridge 30 may be primarily disposed in the toothbrush handle 21 within an internal cavity 28 formed therein. The handle 21 may be overmolded onto the cartridge in some embodiments, and in other embodiments the cartridge may be inserted into the cavity after the molding process.

Referring to FIGS. 1 and 4-16, the main reservoir 40 for storing a personal care fluid such as an oral care fluid F containing an active agent has a generally elongated hollow tubular body including a proximal end 41, distal end 42, an internal chamber 43 for storing a predetermined volume of the fluid, and a cylindrical sidewall 44. Sidewall 44 in one embodiment may have a circular transverse cross sectional shape. In other embodiments, the sidewall may be other shapes including for example without limitation elliptical or polygonal having a non-circular cross sectional shape. The invention is not limited by the shape of the sidewall.

Distal and proximal ends 42, 41 of main reservoir 40 may be open as shown in the illustrated non-limiting embodiment. A transversely oriented intermediate division wall 45 is formed between the distal and proximal ends 42, 41 which divides the main reservoir 40 into a fluid-containing distal section 47 and an empty proximal section 48. Wall 45 defines a recessed socket 46 facing section 47 for abuttingly engaging, supporting, and centering a proximal end of the capillary member 32. Socket 46 may be generally circular in shape to complement the cross sectional circular shape of the capillary member 32. The division wall 45 may be solid and impervious to liquids such that the oral care fluid F stored in the distal section of the main reservoir adjacent the overflow reservoir 60 cannot infiltrate into the empty distal section 48 thereof.

In some embodiments, the capillary member 32 may be segmented in structure having a proximal segment 32b disposed primarily in the main and overflow reservoirs 40, 60 and a distal segment 32a extending from the overflow reservoir end cap 72 to the applicator 31 (see, e.g. FIGS. 13-16). In other embodiments, the capillary member 32 may be one-piece.

Overflow reservoir 60 has a generally elongated hollow tubular body including a proximal end 62, distal end 61, an internal chamber 63 for storing an overflow volume of the fluid F received from the main reservoir 40 (as further explained herein), and a cylindrical sidewall 64 in one embodiment having a circular transverse cross sectional shape. In other embodiments, the sidewall may be other shapes including for example without limitation elliptical or polygonal having a non-circular cross sectional shape. In one preferred embodiment, the configuration and diameter of sidewall 64 may have the same configuration and diameter to of the main reservoir sidewall 44 as shown herein to form a smooth and contiguous transition therebetween for the assembled fluid dispensing cartridge 30. The invention, however, is not limited by the shape of the sidewalls 44 or 64 used and other embodiment may have reservoirs of different shapes and/or diameters.

Figure 15:
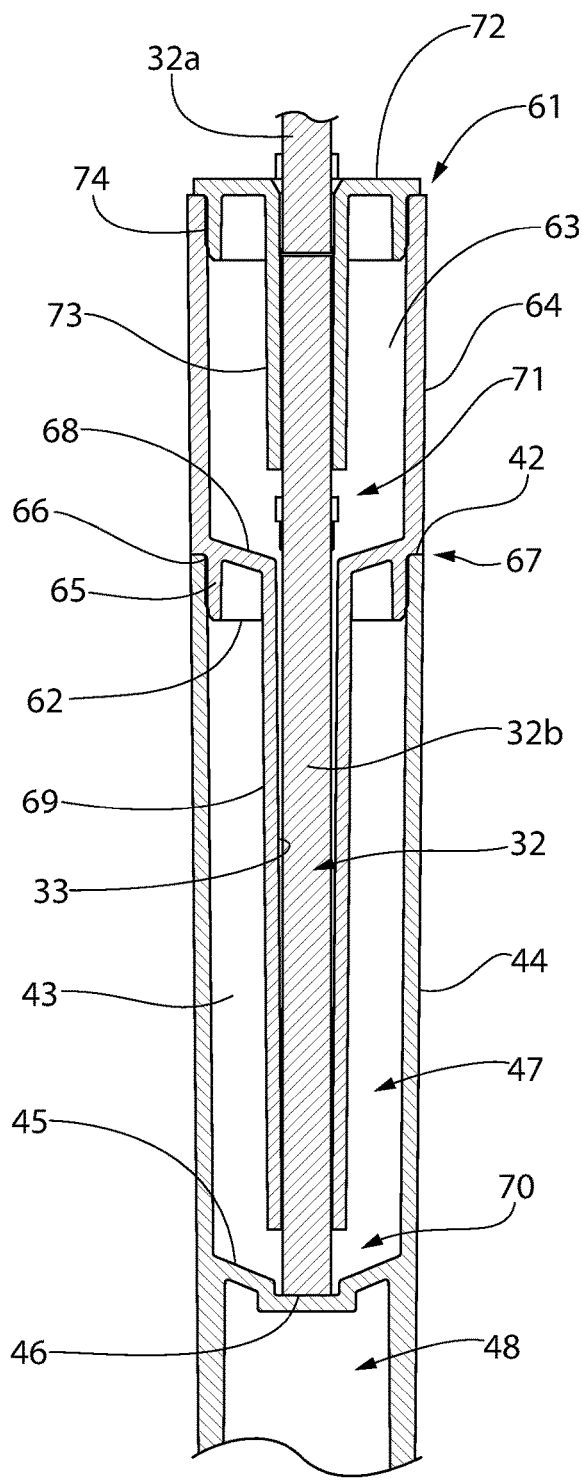
FIG. 15 is an enlarged view taken from FIG. 15.
Figure 16:
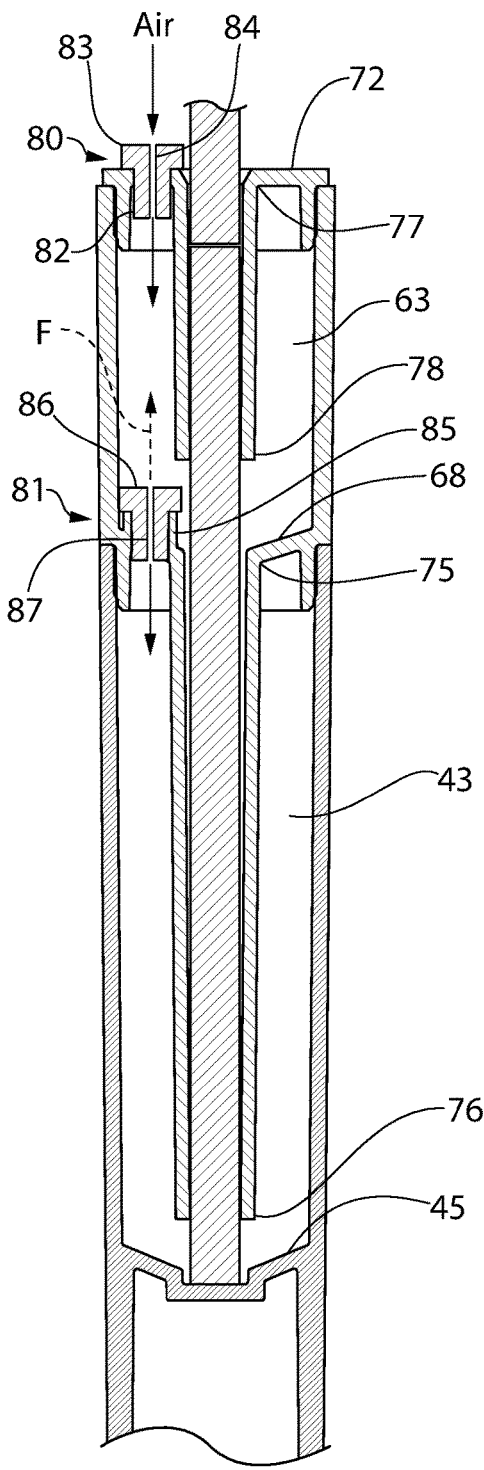
FIG. 16 is an enlarged view taken from FIG. 16.

The overflow reservoir 60 may be configured to form a leak-resistant insertable frictional fit to main reservoir 40 for coupling the components together. In one non-limiting configuration, the proximal end 62 of the overflow reservoir has a diametrically smaller annular coupling collar 65 which is insertable into open distal end 42 of the main reservoir 40 as best shown in FIGS. 15 and 16. Collar 65 extends axially outwards beyond the larger diameter main section of the overflow reservoir 60 above, thereby forming a stepped transition or shoulder 66 therebetween. The shoulder 66 allows the outer circumferential surfaces of the overflow and main reservoirs 60, 40 to be flush at the joint 67 between the reservoirs when assembled. Coupling collar 65 accordingly has a smaller diameter than the internal diameter of the main reservoir adjacent the proximal end 42. In some implementations, the overflow reservoir 60 may optionally be ultrasonically welded to the main reservoir 40 at the annular joint 67 as an additional safeguard to prevent leakage.

To physically separate the main reservoir 40 from the overflow reservoir 60, a transversely oriented partition wall 68 is disposed between the reservoirs. In one embodiment, as illustrated, the wall 68 be formed nearest the proximal end 62 of overflow reservoir 60 as an integral unitary structural part of the overflow respectfully submits, or in other embodiments as a separate part attached to the overflow reservoir. In yet other embodiments, the partition wall 68 may be provided with the main reservoir 40 instead. Either arrangement is possible.

A cantilevered capillary channel extension tube 69 is connected to and protrudes outwards in an axial proximal direction (i.e. along the longitudinal axis A-A) from the proximal end 62 of the overflow reservoir 60 and into the main reservoir 40 when assembled together as shown in FIGS. 1, 6, and 13-16. Tube 69 has a hollow cylindrical shape and receives the cylindrical capillary member 32 therethrough as shown. The tube 69 is formed of a solid material impervious to liquid flow and preferably extends for a majority of both the axial length of the distal section 47 of the main reservoir 40 and the portion of the capillary member 32 located inside the main reservoir.

The main reservoir capillary channel extension tube 69 has a distal fixed end 75 connected to partition wall 68 of overflow reservoir 60 and a proximal free end 76 which terminates at a point spaced apart from the division wall 45 of the main reservoir 40. In one embodiment, the extension tube 69 has a length which extends for substantially the entire length of the capillary member 32 within the main reservoir 40 (e.g. a majority portion greater than 50% of the length, and more preferably greater than 75%) except for a minor end portion or length of the capillary member adjacent division wall 45 (e.g. 25% or less of the length of the capillary member in one non-limiting embodiment). This forms an exposed portion or section 70 of capillary member 32 nearest the division wall 45 within the fluid containing distal section 47 of the main reservoir. The exposed section 70 is preferably located in the proximal-most end of the distal section of the main reservoir 40 within internal chamber 43. This proximal exposed section 70 assists with preventing leakage of the oral care fluid F from the fluid dispensing cartridge 30 when the toothbrush 20 is oriented in an upside-down or inverted position, as further explained elsewhere herein. Preferably, the extension tube 60 is configured and dimensioned to form a tight conformal interference fit with the capillary member 32 disposed inside to prevent a direct leakage flow path through the tube into the overflow reservoir 60. Accordingly, fluid F can only flow in an axial direction through the extension tube 69 within capillary member 32 via capillary action.

Referring to FIGS. 1-16, overflow reservoir 60 includes an end cap 72 which closes and seals the open distal end 61 of the reservoir. In one embodiment, end cap 72 may include some of the same features as the overflow reservoir described above, including a frictional fit reduced diameter coupling collar 74 for insertion into distal end 61 of the overflow reservoir and a cantilevered axially protruding capillary channel extension tube 73 which surrounds a majority portion of capillary member 32 within the overflow reservoir. The collar 74 mounts the cap to overflow reservoir 60 via a friction fit, and in some embodiments may optionally be ultrasonically welded to the overflow reservoir to prevent leakage.

The overflow reservoir capillary channel extension tube 73 has a distal fixed end 77 connected to end cap 72 and a proximal free end 78 which terminates at a point spaced apart from the partition wall 68 of the main reservoir 40. The extension tube 73 has a length which extends for substantially the entire length of the capillary member 32 portion within the reservoir 60 (e.g. a majority portion greater than 50% of the length, and more preferably greater than 75%) except for a minor end portion or length of the capillary member (e.g. 25% or less of the length of the capillary member in one non-limiting embodiment). This forms an exposed section 71 of capillary member near the partition wall 68 within the reservoir. The exposed section 71 is preferably located in the proximal-most end of the overflow reservoir 60 within internal chamber 63. This exposed section 71 similarly assists with preventing leakage of the oral care fluid F from the fluid dispensing cartridge 30 when the toothbrush 20 is oriented in an upside down position, as further explained elsewhere herein. Preferably, the extension tube 73 is configured and dimensioned to form a tight conformal interference fit with the capillary member 32 inside to prevent a direct leakage flow path through the tube into the toothbrush 20. Accordingly, the oral care fluid F can only flow in an axial direction through the extension tube 73 within capillary member 32 via capillary action.

The capillary member 32 generally extends in a longitudinal direction along longitudinal axis A-A of the toothbrush 20 for delivering/dispensing oral care fluid F with active agent from the fluid dispensing cartridge 30 to the toothbrush head applicator 31. In one embodiment, capillary member 32 may be in the form of a generally cylindrical fluid feeder or transfer rod as illustrated herein. The capillary member 32 is constructed of a suitable capillary material that provides capillary action to draw or wick liquid from the main reservoir 40 and overflow reservoir 60 (when fluid has been transferred therein from the main reservoir) to the applicator 31. The applicator can be configured as a nonwoven pad, porous membrane, or other structure that allows passage of the fluid F containing the active agent via capillary action. Examples of materials that can be used for the applicator 31 include porous plastics and other porous materials, such as those described below with reference to the capillary member 32. The applicator 31 may have any shape and in some embodiments may generally be configured to conform to the shape of the portion of the toothbrush head 22 to which it is mounted. In one embodiment, the applicator 31 is mounted on the rear side 25 of the toothbrush head; however, in other embodiments the applicator may be mounted on a portion of the front side 24 instead of or in addition to the rear side forming a bifurcated fluid dispensing structure and direction. The invention is not limited by the shape, structure, or location of the applicator.

The capillary member 32 has a capillary structure which may be formed in numerous configurations and from numerous materials operable to produce fluid flow via capillary action. In one non-limiting embodiment, the capillary member 32 may be configured as a tube or lumen having an internal open capillary passageway extending between ends of the capillary member which is configured and dimensioned in cross section to produce capillary flow. The lumen or open capillary passageway may have any suitable cross sectional shape and configuration. In such embodiments the capillary member 32 may be formed of a porous material as described below or a non-porous material (e.g., plastics such as polypropylene, metal, rubber, or others). In other non-limiting embodiments, capillary member 32 may be formed of a porous and/or fibrous material of any suitable type through which a fluid can travel via capillary action or flow. Examples of suitable materials include without limitation fibrous felt materials, ceramics, and porous plastics with open cells (e.g. polyurethane, polyester, polypropylene, or combinations thereof) including such materials as those available from Porex Technologies, Atlanta, Ga. The capillary member material may therefore be a porous material, a fibrous material, a foam material, a sponge material, natural fibers, sintered porous materials, porous or fibrous polymers or other materials which conduct the capillary flow of liquids. Of course, the capillary material is not to be limited by the specific materials noted herein in all embodiments, but can be any material that facilitates movement of a liquid therethrough via capillary action. A mixture of porous and/or fibrous materials may be provided which have a distribution of larger and smaller capillaries. The capillary member 32 can be formed from a number of small capillaries that are connected to one another, or as a larger single capillary rod. The capillary member whether formed as a lumen or of porous or fibrous materials may have any suitable polygonal or non-polygonal cross sectional shape including for example without limitation circular, elliptical, square, triangular, hexagonal, star-shaped, etc. The invention is not limited by the construction, material, or shape of the capillary member.

Some examples of capillary fluid systems are shown, for example, in U.S. Pat. Nos. 5,102,251; 5,352,052; 6,089,776; 6,095,707; 6,164,858; 6,183,155; 6,322,268; and 6,497,527, the disclosures of which are hereby incorporated by reference.

The main and overflow reservoirs 40, 60 may be formed from any suitable non-porous material including plastics/ polymers such as without limitation polypropylene, polyethylene, or others. Preferably, the reservoirs have a solid leak-proof material structure.

To solve the problem of vacuum (i.e. negative pressure) formation or binding within the main reservoir 40 when fluid F is dispensed by the capillary member 32, embodiments of the present invention include a direct air venting or ingestion system which alleviates the vacuum. This system bypasses the capillary channel 33. In one embodiment, with reference to FIG. 16, the fluid dispensing cartridge 30 includes an external vent 80 between the overflow reservoir 60 and atmosphere, and an internal vent 81 between the overflow reservoir 60 and main reservoir 40. Vents 80, 81 formed separate air and fluid flow paths distinct and spaced radially apart from the capillary channel 33. When a negative pressure/vacuum develops in the main reservoir 40, the internal vent 81 in cooperation with the external vent 80 draws ambient air at atmospheric pressure (based on the altitude of the toothbrush) through the external vent into the overflow reservoir 60. The air is then drawn into the main reservoir 40 therefrom which relieves the vacuum in the main reservoir by replacing the volume of oral care fluid dispensed with an equivalent volume of ambient air until a pressure balance is achieved between the main reservoir and atmosphere (see solid airflow directional arrows). This air venting system creates a positive and quick-response vacuum break mechanism by forming a direct airflow path through the fluid dispensing cartridge into the main reservoir 40 which does not rely on the capillary member 32 for any air transport which is generally very limited and insufficient to break the vacuum alone in time to avoid fluid dispensing problems (e.g. limited or no flow).

In one embodiment, the external vent 80 includes an axially oriented vent hole 82 formed in end cap 72 which is closed by an inserted vent plug 83 (best shown in FIG. 16). Vent plug 83 includes a through orifice 84 which extends completely through the plug in an axial direction from end to end. Internal vent 81 similarly includes an axially oriented vent hole 85 formed in partition wall 68 which is closed by an inserted vent plug 86. Vent plug 86 also includes a through orifice 87 which extends completely through the plug in an axial direction from end to end. Orifices 84, 87 are specifically sized to a predetermined diameter based on the viscosity of and/or surface tension of the oral care fluid F which is operable to allow air to flow freely through the orifices, but sized small enough to prevent the passage of the fluid therethrough under normal operating conditions. Under normal operating conditions therefore, the fluid F is prevented from passing through orifices 84, 87 by the viscosity and/or surface tension of the fluid alone. The diameter of these orifices may be varied based on the viscosity and/or surface tension of the particular oral care fluid F to be used to prevent leakage of fluid through the vents 80 and 81 under normal operating conditions. Based on the diameter of the orifices used, the viscosity and/or surface tension of the fluid F based is relied upon to prevent free passage through the vent plugs 83, 86 in the absence of a direct pressurizing force on the fluid from within the fluid dispensing cartridge reservoirs. It bears noting that an external air port 88 may be formed in the toothbrush handle 21 which is in fluid communication with ambient air and the external vent 80 to draw air into the toothbrush and fluid dispensing cartridge (see, e.g. FIG. 1).

The vent plugs 83, 86 advantageously provide manufacturing convenience by allowing multiple different plugs each having different diameter orifices 84, 87 to be used interchangeably with the same respective vent holes 82, 85. Selection is based on the oral care fluid F to be used and its particular viscosity and/or surface tension. Accordingly, an interchangeable vent plug system is provided allowing the same size vent holes to be used with various different plugs having varying orifice sizing. It will be appreciated that in other embodiments, however, the vent plugs may be omitted and the required diameter orifice may instead be formed directly in the end cap 72 and partition wall 68 to allow air to flow freely into overflow reservoir 60 and in turn the main reservoir 40.

Vent plugs 83, 86 may be formed of any suitable material, including without limitation for example plastics/polymers (e.g. polypropylene, polytetrafluoroethylene, etc.), ceramic, and metals. The materials selected and sizing of the plugs preferably form a tight leak-resistant friction fit with the vent holes 82, 85 in which they are seated. The plugs may be generally cylindrical in shape as shown in the illustrated embodiments, or have other configurations.

In alternative embodiments in lieu of using orifices 84, 87, the vent plugs 83, 86 may instead be configured and constructed of a sintered material forming a labyrinth of internal and fluidly interconnected interstitial open flow passages or spaces throughout the material that are dimensioned to permit the flow of ambient air through the plug and impede the outflow of liquid or leakage based on the viscosity and/or surface tension of the oral care fluid F being used. Such plugs for example may be formed of a sintered polymer or plastic such as PTFE (polytetrafluoroethylene), ceramic, or other sintered materials.

The foregoing air ingestion or venting system provides a direct non-capillary flow path for air ambient movement through the fluid dispensing cartridge 30 reservoirs 40, 60, whereas the capillary member 32 provides the normal capillary flow path by which oral care fluid is dispensed from the main reservoir 40 through the head of the toothbrush. Accordingly, embodiments of the present invention provide a dual and fluidly separate oral care fluid flow paths for different purposes of air ingestion and fluid dispensing.

According to another aspect of the present disclosure, a fluid overflow system is provided to alleviate an expansion of air occurring in the main reservoir 40 caused by an increase in altitude or external temperature. Air contained or trapped in the main reservoir 40 in certain orientations (e.g. toothbrush 20 and fluid dispensing cartridge 30 in a vertically heads-down inverted position), which is a compressible fluid unlike the oral care fluid F, will expand when subjected to an altitude or temperature increase, thereby causing external fluid leakage from the fluid dispensing cartridge and head of the toothbrush. The leakage pathway to compensate for this air expansion is normally through the capillary member 32 and applicator 31, which is highly undesirable. Such leakages may commonly occur for example when traveling by plane with an increase in altitude of the aircraft after takeoff, or traveling by car through mountainous regions having extreme elevation changes. Air trapped in the main reservoir, being a compressible gas, responds to changes in pressure and temperature by expanding.

In one embodiment, the fluid overflow system is formed by the combination of the overflow reservoir 60 and internal vent 81 between the overflow reservoir and main reservoir 40. When an altitude/elevation or temperature increase occurs, the pocket of trapped air within the main reservoir expands putting a pressure force on the fluid F in the main reservoir. The increased pressure on the fluid drives a portion of the fluid F through the internal vent plug 86 into the fluidly coupled overflow reservoir until air expansion stops (see dashed directional fluid flow arrow in FIG. 16). Pressure eventually becomes balanced between the overflow reservoir 60 (which is atmospheric pressure via the external vent 80) and the main reservoir 40 causing the air expansion to subside. It bears noting that any air within the overflow reservoir 60 will similarly expand, thereby relieving pressure via fluid expulsion through the external vent 80 to atmosphere.

Once a portion or volume of fluid is present in the overflow reservoir 60, this fluid cannot normally return through the vent plug 86 and remains trapped in the overflow reservoir since the overflow reservoir remains at ambient atmospheric pressure which is insufficient to drive the fluid back into the main reservoir 40. Referring to FIGS. 15 and 16, the trapped fluid in the overflow reservoir may advantageously still be dispensed during use of the toothbrush by the wetted exposed portion 71 of the capillary member 32 located beyond the extension tube 73 of the overflow end cap 72. Accordingly, when the toothbrush is used, the oral care fluid F will be dispensed simultaneously by both the main reservoir 40 (exposed portion 70 of capillary member 32 therein) and the overflow reservoir 60. The main reservoir 40 may have a larger volumetric capacity than the overflow reservoir 60 which is sized based on the amount of displaced fluid expected to be received from the main reservoir by changes in altitude or temperature during normal usage. In one non-limiting example, the main reservoir 40 may have a volumetric capacity of 4 ml and the overflow reservoir may have a capacity of 2 ml.

The limited exposed portions 70 and 71 of the capillary member 32 within the main and overflow reservoirs 40 and 60 described above further function to prevent or minimize potential leakage when the toothbrush 20 is oriented in a vertical head down or inverted position (i.e. toothbrush head 22 at bottom and handle 21 at top). It should noted that the overflow reservoir 60 is the end of the fluid dispensing cartridge 30 which is closest to the toothbrush head 22 and from which the oral care fluid F is dispensed to the applicator 31 via the capillary member 32 during normal use of the toothbrush when brushing. The benefit of the capillary channel extension tubes 69, 73 in the main and overflow reservoirs 40, 60 is that when the toothbrush is vertically head-down, the surface level of the liquid fluid will probably lie below the exposed portions 70 and 71 of the capillary member 32 within the main and overflow reservoirs respectively. This means that the liquid will be in contact with the impervious capillary channel extension tubes 69 and 73 and not the exposed portions of the capillary member. If the air pocket in the vicinity of the exposed capillary member portions 70 and 71 above the liquid level or surface expands, then the only path for the liquid to travel outwards from the main reservoir 40 when pressurized is through the small internal air vent 81 into the overflow reservoir 60, and not down the capillary member 32 to the applicator 31 where it would otherwise visibly leak out therefrom. Similarly, in the case of any liquid fluid already in the overflow chamber 60 as well, the liquid would be expelled through the external vent 80 and ultimately out of the back of the toothbrush through the external air port 88 in the handle (see, e.g. FIG. 1), rather than out of the applicator 31. The above scenario when the main and overflow reservoirs 40, 60 are inverted with the toothbrush in the head-down position can be visually imagined by turning FIGS. 15 and 16 upside down. The exposed portions 70, 71 of these reservoirs would therefore be at the top of each reservoir with the surface level of the liquid fluid being somewhere below the free ends 76, 78 of the capillary channel extension tubes 69, 73.

In some embodiments, the applicator 31 on the toothbrush head 22 can be incorporated into an elastomeric material to provide a tissue cleanser, which can be used, for example, for cleaning the tongue, cheeks, lips, and/or gums. A tissue cleaner may employ a variety of suitable biocompatible resilient materials, such as elastomeric materials. To provide optimum comfort as well as cleaning benefits, an elastomeric material usually has a hardness property in the range of A8 to A25 Shore hardness, such as styrene-ethylene/butylene-styrene block copolymer (SEBS), available from GLS Corporation.

A tissue cleanser can be configured with a multiplicity of tissue engaging elements, which can be formed as nubs. As used herein, a "nub" is generally meant to include a column-like protrusion (without limitation to the cross-sectional shape of the protrusion) which is upstanding from a base surface. In general, the nub can have a height that is greater than the width at the base of the nub as measured in the longest direction. Nubs also can include projections wherein the widths and heights are roughly the same or wherein the heights are somewhat smaller than the base widths.

Such tissue engaging elements can help reduce a major source of bad breath and improve hygiene. Nubs enable removal of microflora and other debris from the tongue and other soft tissue surfaces within the mouth. The tongue, in particular, is prone to develop bacterial coatings that are known to harbor organisms and debris that can contribute to bad breath. This microflora can be found in the recesses between the papillae on most of the tongue's upper surface as well as along other soft tissue surfaces in the mouth. When engaged or otherwise pulled against a tongue surface, for example, the nubs of elastomeric tissue cleanser can provide for gentle engagement with the soft tissue while reaching downward into the recesses of adjacent papillae of the tongue. The elastomeric construction of a tissue cleanser also enables the base surface to follow the natural contours of the oral tissue surfaces, such as the tongue, cheeks, lips, and gums of a user. In addition, the soft nubs are able to flex as needed to traverse and clean the soft tissue surfaces in the mouth along which it is moved.

The nubs often are conically shaped, such as in the shape of a true cone, frusto-conically shaped elements, and other shapes that taper to a narrow end and thereby resemble a cone irrespective of whether they are uniform, continuous in their taper, or have rounded cross-sections. The smaller width or diameter of the tip portion in conjunction with the length of the conically shaped nub enable the nubs to sweep into the recesses of the tongue and other surfaces to clean the microbial deposits and other debris from the soft tissue surfaces. The nubs also are able to flex and bend from their respective vertical axes as lateral pressure is applied during use. This flexing enhances the comfort and cleaning of the soft tissue surfaces. Alternatively, tissue cleaning elements may have other shapes. As one example, the tissue cleanser and nubs are described in commonly owned U.S. Pat. No. 7,322,067, which is incorporated herein by reference.

The personal care fluid when an oral care fluid F may be a mouthwash, a dentifrice, a tooth whitening agent such as peroxide containing tooth whitening compositions, or the like. Other contemplated fluids include, for example without limitation, antibacterial agents; oxidative or whitening agents; enamel strengthening or repair agents; tooth erosion preventing agents; tooth sensitivity ingredients; gum health actives; nutritional ingredients; tartar control or anti-stain ingredients; enzymes; sensate ingredients; flavors or flavor ingredients; breath freshening ingredients; oral malodor reducing agents; anti-attachment agents or sealants; diagnostic solutions; occluding agents, dry mouth relief ingredients; catalysts to enhance the activity of any of these agents; colorants or aesthetic ingredients; and combinations thereof. In certain embodiments the oral care fluid may be free of (i.e., is not or does not include) toothpaste.

Non-limiting examples of active agents which can be incorporated into the oral care fluid F include antibacterial agents, whitening agents, anti-sensitivity agents, anti-inflammatory agents, anti-attachment agents, plaque indicator agents, flavorants, sensates, and colorants. Examples of these agents include metal ion agents (e.g., stannous ion agents, copper ion agents, zinc ion agents, silver ion agents) triclosan; triclosan monophosphate, chlorhexidine, alexidine, hexetidine, sanguinarine, benzalkonium chloride, salicylanilide, domiphen bromide, cetylpyridinium chloride, tetradecylpyridinium chloride, N-tetradecyl-4-ethylpyridinium chloride (TDEPC), octenidine, delmopinol, octapinol, nisin, essential oils, furanones, bacteriocins, flavans, flavinoids, folic acids, vitamins, hydrogen peroxide, urea peroxide, sodium percarbonate, $PVP—H_2O_2$, polymer-bound perxoxides, potassium nitrates, occluding agents, bioactive glass, arginine salts, arginine bicarbonate, bacalin, polyphenols, ethyl pyruvate, guanidinoethyl disulfide, tartar control agents, anti-stain ingredients, phosphate salts, polyvinylphosphonic acid, PVM/MA copolymers; enzymes, glucose oxidase, papain, ficin, ethyl lauroyl arginate, menthol, carvone, and anethole, various flavoring aldehydes, esters, and alcohols, spearmint oils, peppermint oil, wintergreen oil, sassafras oil, clove oil, sage oil, eucalyptus oil, marjoram oil, cinnamon oil, lemon oil, lime oil, grapefruit oil, and/or orange oil.

The active agent and/or its medium can be selected to complement a toothpaste formula, such as by coordinating flavors, colors, aesthetics, or active ingredients. A flavor can be administered to create a gradual flavor change during brushing, which presently is not possible using toothpaste alone.

The active agent may be compatible with toothpaste, or may be unstable and/or reactive with typical toothpaste ingredients. The active agent also may be a tooth cleaning agent to boost the overall efficacy of brushing.

The active agent can be provided in any suitable fluidic vehicle, such as in aqueous solution in some embodiments. Non-limiting examples of vehicles include water, monohydric alcohols such as ethanol, poly(ethylene oxides) such as polyethylene glycols such as PEG 2M, 5M, 7M, 14M, 23M, 45M, and 90M available from Union Carbide, carboxymethylene polymers such as Carbopol® 934 and 974 available from B.F. Goodrich, and combinations thereof. The selection of a suitable vehicle will be apparent to persons skilled in the art depending on such factors as the properties of the active agent and the desired properties of the medium, such as viscosity. Examples of tooth whitening compositions are described in U.S. Pat. Nos. 6,770,266 and 6,669,930, the disclosures of which are hereby incorporated by reference.

It will be understood that while the invention has been described in conjunction with specific embodiments thereof, the foregoing description and examples are intended to illustrate, but not limit the scope of the invention. Other aspects, advantages and modifications will be apparent to those skilled in the art to which the invention pertains, and these aspects and modifications are within the scope of the invention and described and claimed herein.

What is claimed is:

1. A personal care implement comprising:
    a fluid applicator;
    a fluid dispensing assembly comprising a main reservoir storing a personal care fluid and an overflow reservoir fluidly coupled thereto; and
    a capillary member extending through and in fluid communication with the main and overflow reservoirs, the capillary member fluidly coupled to the applicator wherein the fluid flows via capillary action from the fluid dispensing assembly to the applicator;
    the overflow reservoir in fluid communication with external ambient atmosphere via an external vent; and
    the overflow reservoir in fluid communication with the main reservoir via an internal vent formed between the overflow and main reservoirs;
    wherein a non-capillary air flow pathway is formed through the overflow reservoir between atmosphere and the main reservoir via the internal and external vents.

2. The personal care implement according to claim 1, wherein when a vacuum develops in the main reservoir by dispensing fluid, ambient air flows through the external vent into the overflow reservoir, and then through the internal vent into the main reservoir to replace a quantity of fluid dispensed with air to alleviate the vacuum.

3. The personal care implement according to claim 1, wherein the external vent comprises a vent plug interchangeably inserted into a vent hole of the overflow reservoir, the vent plug configured and constructed to permit an inflow of ambient air into the overflow reservoir and impede leakage of the fluid outwards through the vent plug.

4. The personal care implement according to claim 3, wherein the vent plug includes an orifice sized to permit the inflow of ambient air and prevent the outflow leakage of fluid based on viscosity and surface tension of the personal care fluid.

5. The personal care implement according to claim 3, wherein the vent plug is formed of sintered polymer forming interstitial open pathways through the vent plug sized to permit the inflow of ambient air and impede the outflow leakage of fluid based on viscosity and surface tension of the fluid.

6. The personal care implement according to claim 1, wherein the internal vent comprises a second vent plug interchangeably inserted into a second vent hole formed in a partition wall separating the main and overflow reservoirs, the second vent plug configured and constructed to permit an inflow of ambient air into the main reservoir from the overflow reservoir and impede leakage of the fluid from the main reservoir to the overflow reservoir through the second vent plug.

7. The personal care implement according to claim 1, wherein the main and overflow reservoirs each comprise an elongated cylindrical tubular body, the tubular bodies of the main and overflow reservoirs coaxially aligned.

8. The personal care implement according to claim 1, wherein the main and overflow reservoirs are joined together in end-to-end relationship via a friction fit provided by a reduced diameter coupling collar protruding from a proximal end of the overflow reservoir.

9. The personal care implement according to claim 1, wherein the overflow reservoir includes an extension tube protruding into the main reservoir which covers a majority portion of the capillary member located in the main reservoir to form an exposed portion of the capillary member.

10. The personal care implement according to claim 1, wherein the applicator and the capillary member are in direct surface contact with one another.

11. The personal care implement according to claim 1, wherein the applicator is formed of a porous or fibrous material.

12. The personal care implement according to claim 1, wherein the capillary member comprises a porous or fibrous material.

13. The personal care implement according to claim 1, wherein the capillary member delivers the fluid from the reservoir to the applicator solely by capillary action.

14. The personal care implement according to claim 1, wherein upon expansion of a volume of air in the main reservoir, a portion of the fluid in the main reservoir is driven into the overflow reactor vessel through the internal vent.

15. The personal care implement according to claim 1, wherein the main reservoir includes an intermediate division wall, a proximal end of the fluid dispensing member abuttingly engaging the division wall within a centering socket formed therein.

16. The personal care implement according to claim 1, wherein the personal care fluid comprises an active agent selected from the group consisting of antibacterial agents, whitening agents, anti-sensitivity agents, anti-inflammatory agents, anti-attachment agents, plaque indicator agents, flavorants, sensates, and colorants.

17. A personal care implement comprising:
a fluid applicator;
a main reservoir containing a personal care fluid;
an overflow reservoir fluidly coupled to the main reservoir;
a capillary fluid flow path comprising an elongated capillary member that extends through the main and overflow reservoirs; and
a non-capillary fluid flow path extending between the main and overflow reservoir and configured such that the personal care fluid can flow through the non-capillary flow path from the main reservoir to the overflow reservoir.

18. The toothbrush according to claim 17, further comprising an external vent disposed in the overflow reservoir in fluid communication with external ambient atmosphere, wherein the internal and external vents collectively form an air flow path separate from the capillary fluid flow path between atmosphere and the main reservoir which is operable to draw ambient air into the main reservoir through the overflow reservoir.

19. The personal care implement according to claim 1, wherein the personal care implement is an oral care implement comprising a head and a handle coupled to the head, and wherein the applicator is disposed on the head.

20. A method for breaking a vacuum in a fluid dispensing system of a personal care implement, the method comprising:
providing an personal care implement including a fluid dispensing assembly comprising main and overflow reservoirs, an applicator, and a capillary member in fluid communication with the applicator and the main and overflow reservoirs;
storing an personal care fluid in a main reservoir;
dispensing a portion of the fluid via capillary action from the main reservoir to the applicator via the capillary member;
forming a vacuum in the main reservoir;
drawing ambient air into the overflow reservoir via an external vent;
drawing the ambient air in the overflow reservoir into the main reservoir through an internal vent fluidly coupling the main reservoir to the overflow vent; and
relieving the vacuum.

* * * * *